United States Patent [19]

Tsunoda

[11] Patent Number: 4,660,032
[45] Date of Patent: Apr. 21, 1987

[54] RADIO PAGING RECEIVER OPERABLE ON A WORD-SCROLLING BASIS

[75] Inventor: Kazuyuki Tsunoda, Tokyo, Japan

[73] Assignee: NEC Corporation, Tokyo, Japan

[21] Appl. No.: 896,369

[22] Filed: Aug. 14, 1986

Related U.S. Application Data

[60] Division of Ser. No. 838,205, Mar. 10, 1986, which is a continuation of Ser. No. 484,037, Apr. 11, 1983, abandoned.

[30] Foreign Application Priority Data

Apr. 13, 1982 [JP] Japan ................................. 57-62022

[51] Int. Cl.[4] .............................................. G08B 1/00
[52] U.S. Cl. ............................. 340/825.44; 340/311.1; 340/792
[58] Field of Search ...................... 340/825.44–825.48, 340/311.1, 792, 724, 726, 789; 434/114, 116; 179/2 EC

[56] References Cited

U.S. PATENT DOCUMENTS

| | | | |
|---|---|---|---|
| 3,976,995 | 8/1976 | Sebestyen | 340/792 X |
| 4,359,730 | 11/1982 | Kunikane et al. | 340/792 |
| 4,373,192 | 2/1983 | Yanagiuchi et al. | 340/792 X |
| 4,403,212 | 9/1983 | Masaki | 340/311.1 |
| 4,437,095 | 3/1985 | Akahori et al. | 340/825.44 |
| 4,504,825 | 3/1985 | Bergermann et al. | 340/792 X |

Primary Examiner—Ulysses Weldon
Attorney, Agent, or Firm—Sughrue, Mion, Zinn, Macpeak & Seas

[57] ABSTRACT

A radio paging receiver comprises a linear array of display elements, a memory having a plurality of storage locations for storing a received message code therein, and a microprocessor-based decoder. The microprocessor-based decoder is responsive to a received preamble code for detecting a match between an address code and a user's own code to store a message codeword into the memory in response to the detection of the match. A first sequence of characters is read from predetermined storage locations of the memory and fed to the display elements. In succession, a blank which immediately follows the first sequence is detected to read a second sequence of characters from the positions immediately following the detected blank and displayed by clearing the characters of the first sequence.

2 Claims, 19 Drawing Figures

| P | L | E | A | S | E | | G | O | | T | O | | | 9 | T | H | | H | O | L | E | | A | T | | 3 | | P | M | * |
|---|---|---|---|---|---|---|---|---|---|---|---|---|---|---|---|---|---|---|---|---|---|---|---|---|---|---|---|---|---|

FIG.10b

| P | L | E | A | S | E | | G | O | | T | O |

FIG.10c

| 1 | 9 | T | H | | H | O | L | E | | A | T | | 3 |

FIG.10d

| P | M | * |

RADIO PAGING RECEIVER OPERABLE ON A WORD-SCROLLING BASIS

This is a division of application Ser. No. 838,205, filed Mar. 10, 1986, which is a continuation of application Ser. No. 484,037, filed Apr. 11, 1983, now abandoned.

BACKGROUND OF THE INVENTION

The present invention relates to a paging system, and in particular to a receiver having a microprocessor-based control unit which decodes a transmitted radio frequency paging signal for providing a display on a linear array of elements and scrolling the displayed characters through the array.

In conventional radio frequency paging systems, individual portable receivers have a linear array of display elements on which the message is displayed upon detection of a match between a received address code and the subscriber's own code which is assigned to the receiver. The wordlength of the message usually exceeds the capacity of the display elements due to the small space available. The current practice is to display a portion of the received message at a time and then scroll it on a per character basis from one end of the array toward the other. However, this type of scrolling demands rapid eye movements and renders the message less intelligible since written information is usually perceived on a per word or word-group basis.

SUMMARY OF THE INVENTION

It is therefore an object of the present invention to provide a radio paging receiver which is capable of scrolling a received message on a word or word-group basis.

The paging receiver is adapted to receive a radio frequency signal containing a preamble, a subscriber address code and message codes representing a plurality of blocks of characters and blanks. According to the invention, the receiver includes a linear array of display elements, a memory having a plurality of storage locations for storing the message codes therein, and data processing means. The data processing means, or microcomputer, is responsive to the preamble for detecting a match between the received address code and a predetermined code, storing the message code into the memory in response to the detection of the match, reading a first sequence of characters from predetermined storage locations of the memory into the display elements. When the first sequence of characters is displayed, the position of a blank immediately following the first sequence is detected to read a second sequence of characters from the positions immediately following the detected position of the blank and fed into the display elements instead of the first sequence.

In a preferred embodiment of the invention, the data processing means is arranged to introduce a time interval between the times the first and second sequences are read into the display elements. This allows the user a sufficient time to perceive the displayed word or words which are automatically scrolled to the next word or words at the end of the time.

In a further preferred embodiment, the data processing means is arranged to introduce a first, longer interval in response to the first sequence being read into the display elements and successively read a sequence of characters from a position displaced by one character position from the first sequence at a second, shorter interval until the blank is detected. In this mode of operation, each sequence of characters remains displayed for a long interval to allow the user a sufficient time for perception and then the message is scrolled on a per character basis at short intervals until the next sequence appears.

In a still further preferred embodiment, the data processing means is arranged to scan a predetermined number of storage locations of the memory prior to the reading of each one of first and second sequences of characters to detect when a block of characters therein partially spills over the end of the display elements. When this occurs, each of the first and second sequences is formed with one or more blocks of characters preceding the partially spilled block of characters.

BRIEF DESCRIPTION OF THE DRAWINGS

The present invention will be described in further detail with reference to the accompanying drawings, in which:

FIG. 5 is an illustration of a received message stored in a memory location of the data memory of FIG. 2;

FIGS. 6a to 6f are illustrations associated with the flowchart of FIG. 3;

FIGS. 10a to 10d are illustrations of characters displayed according to the third embodiment.

DETAILED DESCRIPTION

Figure 1:
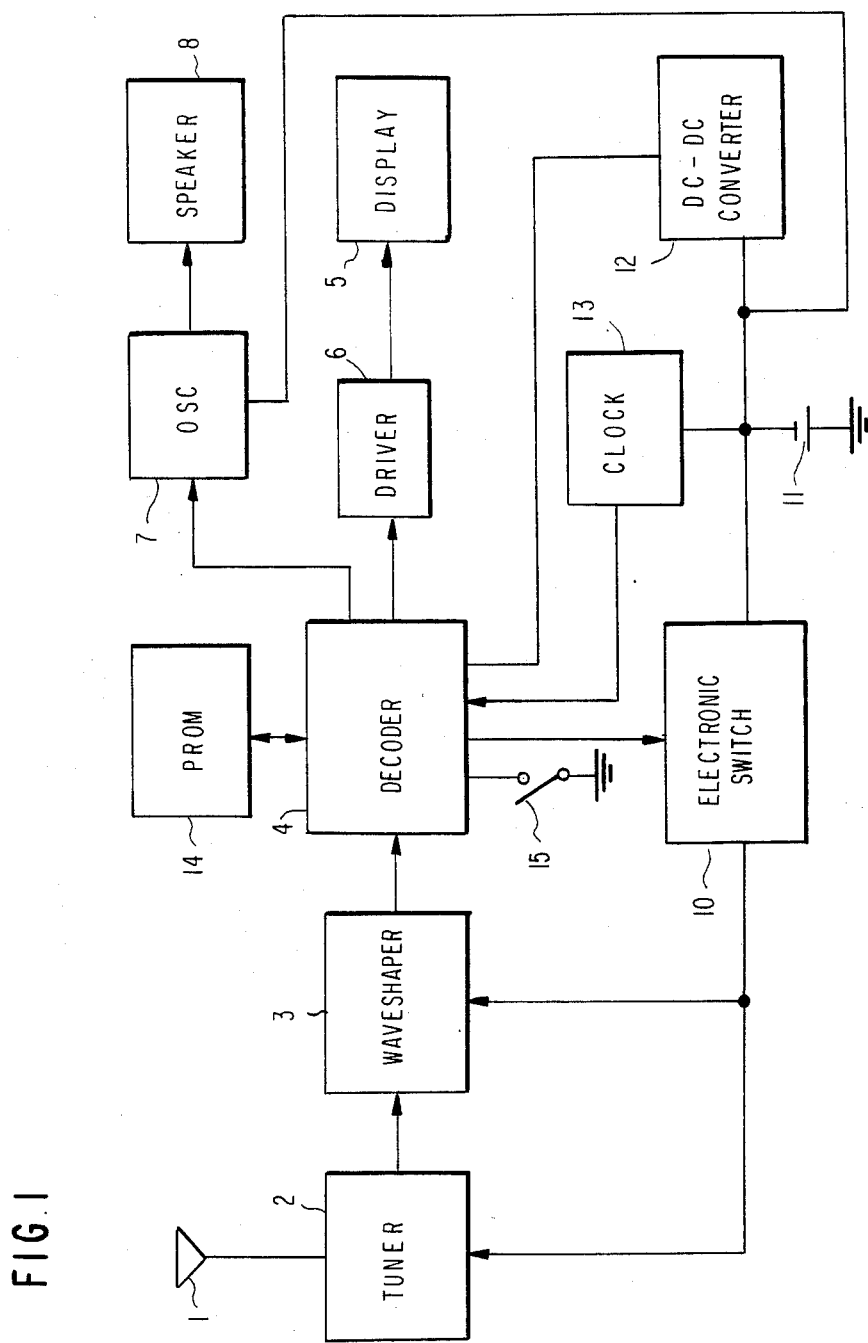
FIG. 1 is a block diagram of a radio paging receiver embodying the present invention.

Referring now to FIG. 1, there is shown a paging receiver embodying the present invention. The paging receiver comprises a tuner 2 having one or more radio frequency amplifier stages, a local oscillator and a mixer for receiving a radio frequency signal intercepted by an antenna 1 and converts the radio frequency to an intermediate frequency. The output of the tuner 2 is applied to a waveshaper 3 wherein the signal is shaped into a waveform having sharply defined edges and distinguishable voltage levels suitable for it to be processed in a microprocessor-based decoder 4. The tuner 2 and waveshaper 3 receive power from a battery 11. Since the tuner and waveshaper are constructed of discrete components, these circuits account for a greater part of the total power consumption of the system. For power saving purposes an electronic switching circuit 10 is provided in a power line to these components to periodically cut it off during idle periods in response to a signal from the decoder 4.

A DC-DC converter 12 steps up the battery voltage to a level sufficient to operate the decoder 4. The microprocessor-based decoder 4 is in receipt of clock pulses from a clock source 13 to perform decoding operations on the signal recevied from the waveshaper 3 in synchronized fashion with associated external circuits which include a drive circuit 6, an 8-digit liquid crystal display panel 5, and a programmable read only memory (PROM) 14.

In the PROM 14 is stored a subscriber's own address codeword with which the received address codewords are each checked to detect a match therebetween. When this occurs, the decoder 4 activates an audio frequency oscillator 7 to apply a tone signal to a loudspeaker 8 to alert the user that he is being paged. A manual key 15 is provided to terminate the alarm sound. In one embodiment, the user is further urged to operate the key 15 each time a predetermined amount of characters is displayed on the panel 5.

Figure 2:
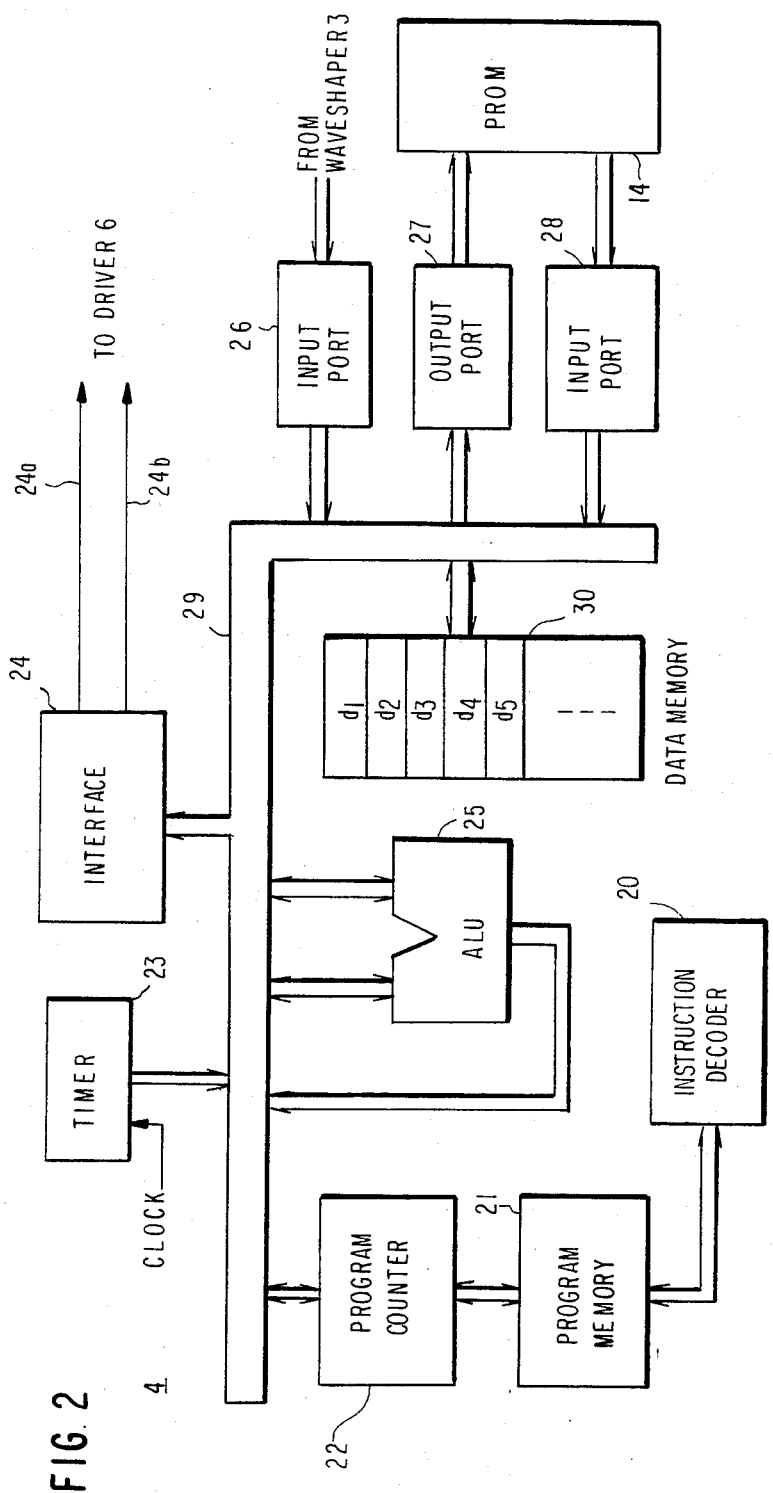
FIG. 2 is a block diagram illustrating the detail of the microprocessor-based decoder of FIG. 1.

As illustrated in FIG. 2, the decoder 4 comprises an instruction decoder 20 which translates the instructions it receives from a program memory 21 when addressed by a program counter 22. A multi-timer 23 which provides timing signals to various parts of the system. An arithmetic logic unit 25 executes arithmetic and logic operations in accordance with instructions issued from the decoder 20. The signal from the waveshaper 3 is applied to an input port 26.

Figure 3:
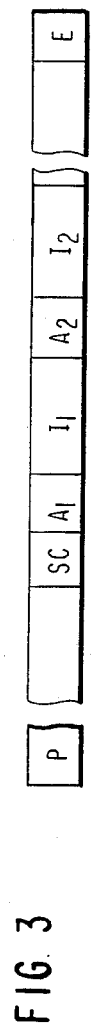
FIG. 3 is an illustration of the format of received codewords.

The code format of the paging system, shown in FIG. 3, starts with a preamble P followed by a word synchronization codeword SC to attain word synchronization for a sequence of subscriber data including address codewords A and message codewords I. The end of the format is indicated by an end-of-transmission codeword E.

During idle periods the power saving operation is effected to open the electronic switch 10 at intervals to reduce the amount of power dissipated in the tuner and waveshaper. When the input signal is received from the waveshaper 3 through input port 26 and a preamble P is detected, the power saving operation is discontinued by the decoder. The microprocessor 20 proceeds to detect a word synchronization codeword SC to establish word synchronization and then to compare the succeeding address codeword $A_1$ against the address data stored in the PROM 14 by successively addressing it through an output port 27 and reading the addressed data through an input port 28.

If the address codeword $A_1$ is matched with the user's own address codeword, the tone oscillator 7 is energized to generate a sound alarm. A succeeding message codeword $I_1$ is then loaded into a storage location $d_1$ of a data memory 30. Upon the operation of key 15, the message codeword $I_1$ is read out of the memory 30 in a manner as will be detailed hereinbelow and transmitted from an interface 24 on a line 24a to the driver 6 and thence to the display panel 5 with an associated synchronization code on a line 24b. In response to the receipt of an end-of-transmission codeword E, the microprocessor 20 places an enabling signal to the electronic switch 10 to reinitiate the power saving operation.

Figure 4:
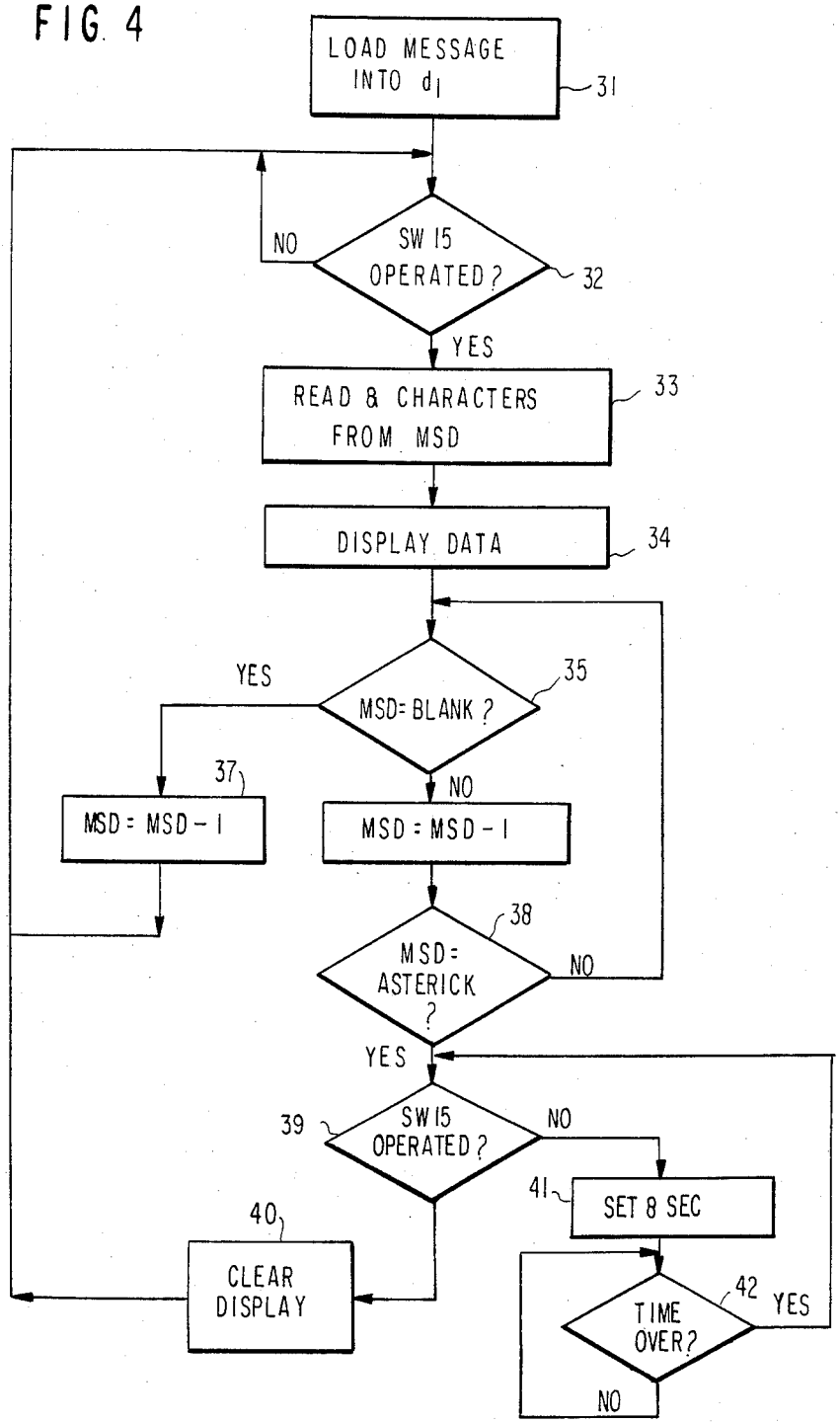
FIG. 4 is a flowchart describing the instructions of the microprocessor of FIG. 2 programmed according to a first embodiment of the invention.

FIG. 4 is a flowchart describing a display operation according to a first preferred embodiment of the present invention. In this embodiment, the display panel 5 comprises an eight-segment liquid crystal display. Under certain circumstances where a lengthy word contains more than eight characters, only the eight most significant digit characters are displayed. However, the loss of one or two least significant digit codes does not materially affect on the intelligibility of the word.

Figures 5, 6F:
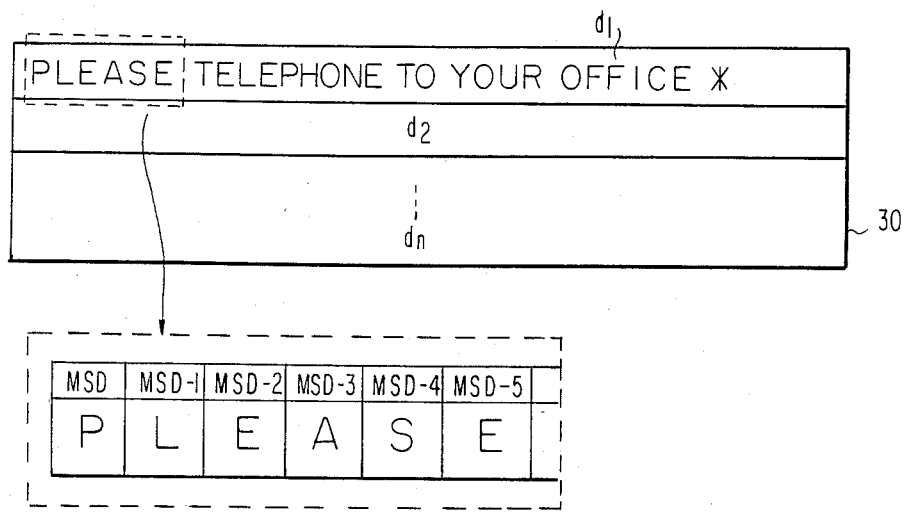

After detecting the address codeword $A_1$, the microprocessor starts executing the programmed instructions at Step 31 by loading the succeeding message codeword $I_1$, which typically comprises a sequence of 7-bit ASCII codes, for example "PLEASE TELEPHONE TO YOUR OFFICE *", into the location $d_1$ of memory 30 as illustrated in FIG. 5. The microprocessor 20 goes to a Step 32 to check if the manual key 15 has been operated, and if so, executes a Step 33 by reading eight 7-bit codes "PLEASE T" from the MSD to MSD-7 digit positions of memory location $d_1$ and executes a Step 34 by putting the data on display as shown in FIG. 6a. The Step 32 will be repeatedly executed until the key 15 is operated.

At step 35, the microprocessor checks if there is a blank in the MSD position of memory location $d_1$, and if not, executes a Step 36 to decrement a "variable" stored in an MSD position by one and returns through a Step 38 to the Step 35. The Steps 35, 36 and 38 are executed seven times until a blank is detected in the MSD-6 position. When this occurs, the microprocessor moves to a Step 37 to decrement the MSD variable by one so that the current status of the MSD variable is MSD-7, or the eighth MSD position where the character "T" is stored. The microprocessor now returns to the Step 32 to check if the key 15 is again operated, and if so, the Step 33 is executed to read the next eight 7-bit codes from the MSD-7 to MSD-14 positions using the current MSD variable, so that the codes "TELEPHON" are retrieved, and subsequently displayed in Step 34 (see FIG. 6b).

The above process is repeated to provide display as shown in FIGS. 6c to 6e until an asterisk "*" which is located at the end of the message is detected in Step 38. The Step 38 is followed by a Step 39 to detect if the key 15 is operated, and if so, the display panel 5 is cleared (FIG. 6f) in Step 40 to permit the microprocessor to return to the Step 32 to repeat the above process. If the switch 15 is not detected as being operated in Step 39, a delay time of 8 second is set in a memory in Step 41 and counted in Step 42. After the 8-second pause lapses, the program returns to Step 39, so that the status of the switch 15 is checked at 8-second intervals until it is operated. It is seen therefore that according to the first embodiment of the invention, the message is scrolled manually on a per word group basis.

Figure 7:
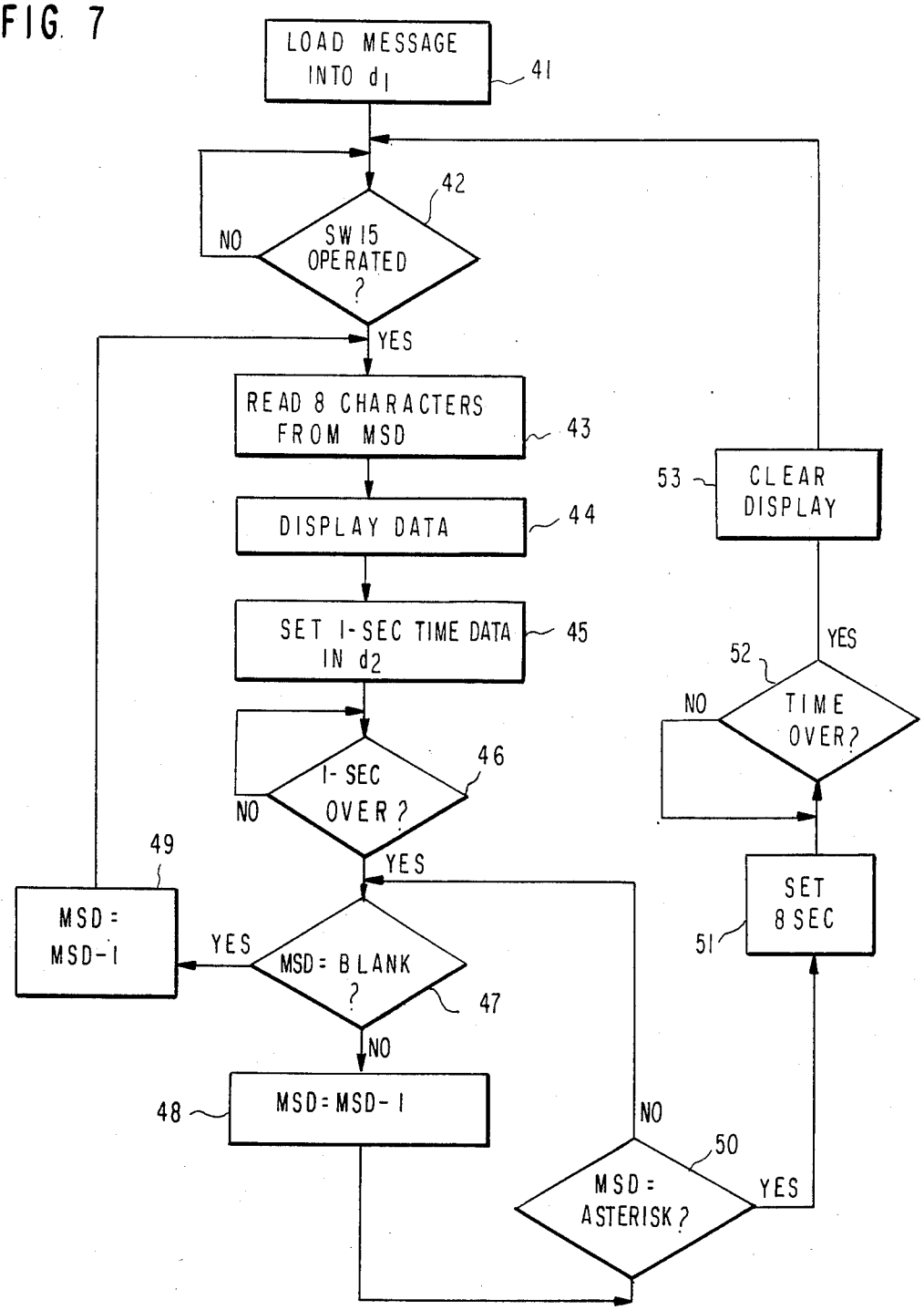
FIG. 7 is a flowchart of the instructions programmed according to a second embodiment of the invention.

According to a second embodiment of the invention, the message is scrolled automatically on a per word-group basis. FIG. 7 is an illustration of a flowchart according to this embodiment. Similar to the Step 31 of FIG. 4, a message codeword is loaded into memory location $d_1$ in Step 41, and followed by a Step 42 to check if the key 15 is operated, and if so, Steps 43 and 44 are successively executed to display the first eight characters "PLEASE T". At Step 45, a "1-second" delay time flag is set up in a memory location $d_2$. Clock is counted in Step 46 to check if 1 second has lapsed. A Step 47 is executed to check if a blank is present in the MSD position of the memory location $d_1$. A Step 48 is then executed if no blank is detected in Step 47 to decrement the MSD variable by one. The microprocessor goes to a Step 50 to detect the asterisk and if not, returns to the Step 47 to successively decrement the MSD variable until the blank in the MSD-6 position is detected at Step 47. If a blank is detected in Step 47 the microprocessor exits to a Step 49 to further decrement the MSD variable by one so that the current status of the MSD variable is MSD-7. The microprocessor returns to the Step 43 to reset the display panel 5 and read out the next eight characters "TELEPHON". When the asterisk is detected in Step 50, an 8-second delay is introduced by Steps 51 and 52 before the microprocessor clears the display panel 5 at Step 53. After execution of Step 53, the program returns to Step 42. Therefore, the message is scrolled automatically at 1-second intervals on a per wordgroup basis.

Figure 8:
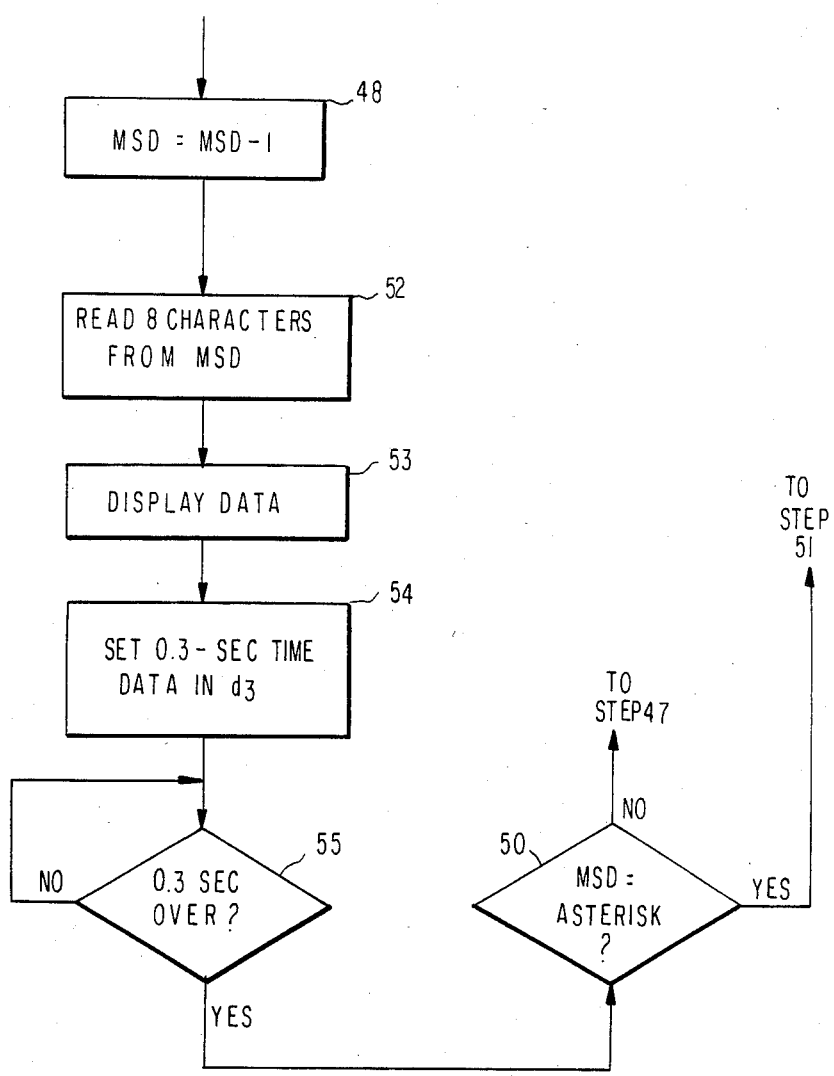
FIG. 8 is a flowchart of the instructions programmed according to an alternative embodiment of the invention.

The flowchart of FIG. 7 is modified as shown in FIG. 8 which differs from the FIG. 7 embodiment by the inclusion of a string of Steps 52 to 55 interposed between the Steps 48 and 50 of FIG. 7. After decrementing the MSD variable by one at Step 48 so that its current value is MSD-1, the eight characters of the MSD-1 to MSD-8 ("ELEPHONE") are read out of memory location $d_1$ at Step 52 and displayed at Step 53. A 0.3-second delay time flag is set up in a memory location $d_3$ at Step 54 and this time interval is checked at Step 55. After the introduction of a 0.3-second interval, the microprocessor returns through Step 50 to the Step 57 to repeat the string of Steps 47, 48, 52 to 55, 50 and 47 again to scroll the message at 0.3 intervals on a per character basis until a blank is detected in Step 47.

It is seen therefore that the first eight characters "PLEASE T" remain displayed for a 1-second period and are then scrolled at 0.3 intervals so that one character disappears from the display and another appears until the blank between E and T moves to the leftmost segment of the display panel and subsequently the next eight characters "TELEPHON" remains displayed for a 1-second period. In this embodiment, all the characters of a word having more than 8 characters are made to appear on the display panel during the 0.3-second interval scroll.

Figure 9A:
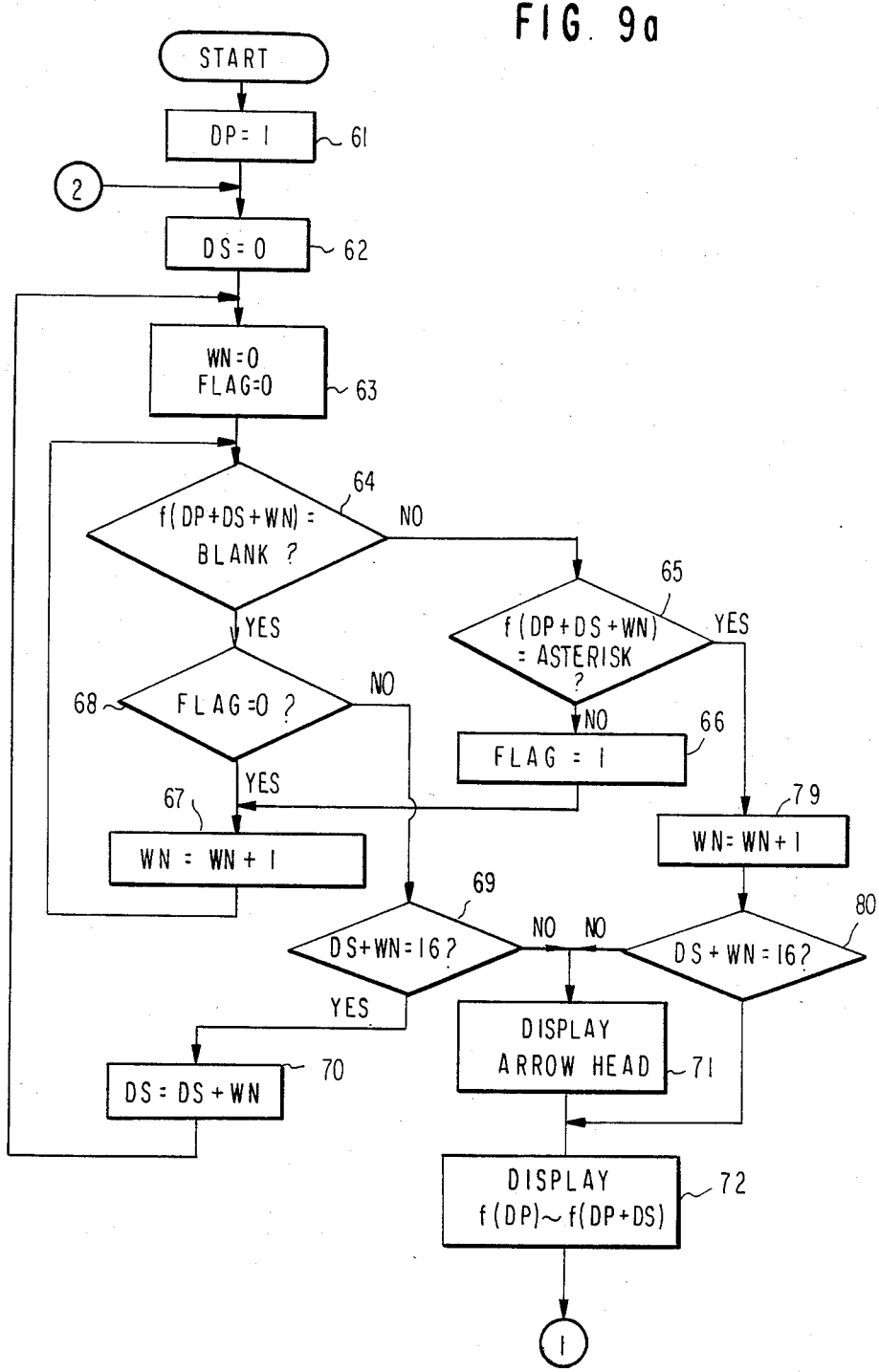
FIGS. 9a and 9b are a flowchart of the instructions programmed according to a third embodiment of the invention.
Figure 9B:
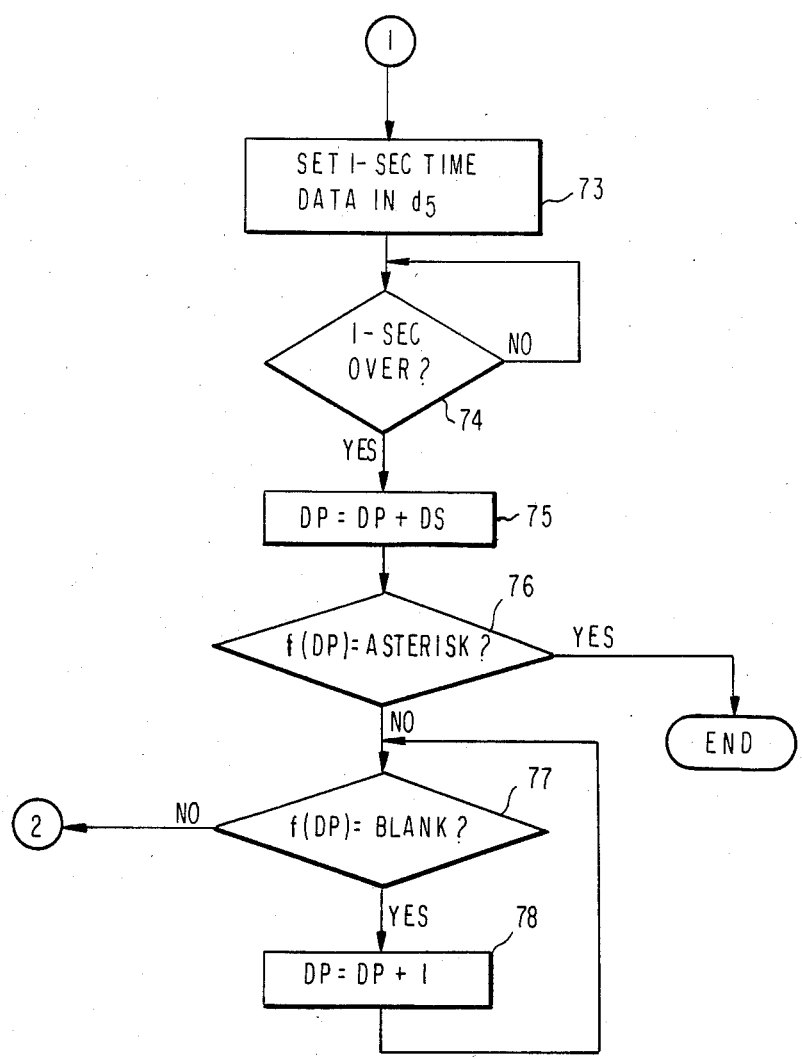

FIGS. 9a and 9b are a flowchart of a further preferred embodiment of the present invention. In the previous embodiments the last word of any sequence is partially displayed if this word spills over the end of the display panel.

In the present embodiment, the previously used MSD variable is divided into a first variable WN which represents the number of characters counted before a blank is detected, a second variable DS which is updated with and accumulate the first variable, and a third variable or display pointer DP which is updated each time a sequence of characters is displayed to accumulate the second variable. These variables are stored in WN, DS and DP registers, respectively. The total count of the DP and DS registers are used to determine the characters to be displayed when the total count of the WN and DS registers exceeds the maximum number of display elements.

For purposes of illustration a 16-element display panel is used and a sentence "PLEASE GO TO 19TH HOLE AT 3 PM*" is stored in a memory location $d_5$. As illustrated in FIG. 10a, the characters stored in location $d_5$ are each identified by an address code corresponding to the total value of DP, DS and WN registers, which is expressed in the flowchart as a function $f(DP+DS+WN)$. On the other hand, the characters to be displayed are addressed by a code corresponding to the total count of the DP and DS registers which is expressed in the flowchart as a function $f(DP+DS)$.

Referring to FIGS. 9a and 9b, the program starts when the input data are stored in memory location $d_5$ and the key 15 operated. At Step 61 the display pointer register DP is set to "1", at Step 62 the DS register is set to "0", and at Step 63 the WN register and a flag are both set to "0". At Step 64, the microprocessor checks if the digit position identified by the total count of the DP, DS and WN registers is a blank, and if not, goes to a Step 65 to check if that digit position is an asterisk, and if not, goes to a Step 66 to set up the flag and thence to a Step 67 to increment the WN register by one and returns to the Step 64. The microprocessor passes through Steps 64, 65, 66 and 67 back to Step 64 repeatedly to scan the characters "PLEASE" to detect a blank that follows when DP=1, DS=0, WN=6, and passes through a Step 68 to a Step 69. The total of DS and WN registers, which indicates the number of digit positions scanned up to this moment, is checked if it is still smaller than the maximum number of the available display segments to allow the microprocessor to increment the DS register by an amount equal to the first variable WN in Step 70 and return to Step 63 to reset the WN register and flag to "0". With the blank at the 7th digit position being detected and the flag being reset to zero, the microprocessor now passes through Steps 64 and 68 and increments the WN register by one at Step 67 to shift the scanning point to the 8th digit position to detect the character "G". Thus, Steps 64, 65, 66, 67 and back to 64 are repeatedly looped to scan the next word "GO". Step 68 is then executed when the scanning point reaches the tenth digit position where a second blank is stored to permit the microprocessor to check if the number of scanned characters is still smaller than 16. Therefore, the first variable WN is reset each time a blank is detected, while the second variable DS is incremented by an amount equal to the first variable before the first variable is reset to zero.

The above process is repeated until the scanning point reaches the 17th digit position. The total count of DS and WN registers is now 17 and the microprocessor exits from Step 69 to a Step 71 to put an arrow head on a separate display element 100 located above the 16-th digit position of the display panel 5 (see FIG. 10b). This arrow head indicates that there is still at least one word to follow. At this moment, the total count of the DP and DS registers equals 13 (=1+12).

The microprocessor advances to a Step 72 to address the characters as a function of variables from DP=1 to DP=1+12 to display the characters "PLEASE GO TO" (FIG. 10b) in a first display cycle.

These characters remain on display for a period of 1 second by setting 1-second pause data into a memory location $d_5$ in Step 73 and checking the elapse of this period in Step 74. The Steps 73 and 74 may be replaced with a step which detects the operating condition of the manual key 15 so that the display cycle continues as long as the user desires.

At the end of a display cycle, the display pointer DP is incremented by an amount equal to the second variable DS in Step 75. At Step 76, a digit position addressible by the updated display pointer DP is checked if it is filled with an asterisk, and if not, Steps 77 and 78 are repeatedly executed to increment the variable DP by one until the first character of the next word "19TH" is detected in Step 77. The microprocessor now returns to the Step 62 to reinitiate the second display cycle by repeating the above process to display "19TH HOLE AT 3".

During the second display cycle the display pointer DP remains set to 14. The first, WN variable is incremented to 4 by the characters "19TH", reset to zero, and then incremented to 5 by the characters "HOLE" plus a blank that follows, then reset to zero and incremented to 3 by the characters "AT" pluse a following blank, reset to zero by that blank and incremented to 2 by the character "3" plus a following blank, reset again by the last-mentioned blank and incremented to 3 by the characters "PM*". Therefore, the DS variable is incremented to 14 by the time all the digit positions are scanned. An asterisk is now detected in Step 65 and the microprocessor goes to a Step 79 to increment the WN variable by one and goes to a Step 80 to check if the total of DS and WN variables exceeds 16 to allow the microprocessor to exit to the Step 71 to put an arrow head on display at the 16th digit position (FIG. 10c). Since the DP and DS variables are both 14, the characters stored in the 14th to 28th digit positions are addressed in Step 72 for display as a function of variables from DP=14 to DP=14+14. Upon the elapse of 1-second interval, the DP variable is again incremented by an amount equal to DS which is now 14, so that DP is now 28. In Step 76, the digit position corresponding to DP=28 is checked if it contains an asterisk and control exits to Step 77 to increment WN by one in Step 78 to return to Step 63.

During the third display cycle, the DP variable is incremented to 29 by execution of Steps 64, 68 and 67 and the DS variable is incremented to 2 by the time the characters "PM*" are scanned. The asterisk is again detected in Step 65 to follow the Steps 79 and 80. Since the total of DS and WN variables is smaller than 16 this time, the arrow head display step 71 is bypassed to allow only the last word "PM*" to be displayed in Step 72. After a 1-second interval, the DP variable is set to 31 (=29+2) corresponding to the digit position of the asterik which is detected in Step 76 to terminate the program.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A paging receiver adapted to receive a radio frequency paging signal containing a preamble, a subscriber address code and a message code represented by a plurality of blocks of characters and blanks between successive characters, comprising:
   a linear array of display elements;
   a memory having a plurality of storage locations for storing said message code therein; and
   data processing means responsive to said preamble for detecting a match between the received address code and a predetermined code, storing said message code into said memory in response to the detection of said match, reading a first sequence of characters including the beginning of a word from said memory and displaying same on said display elements, sequentially detecting a blank between successive characters stored in said memory, reading a second sequence of characters including the beginning of a word from the storage positions of said memory immediately following the detected blank, and updating said display elements with the characters of the second sequence read out of the memory such that the beginning of said updated display is the start of a word;
   wherein said data processing means comprises a microcomputer programmed to execute the following steps:
   (a) reading a sequence of characters out of storage locations of said memory which are specified by a variable and displaying same on said display elements;
   (b) introducing a first, longer pause;
   (c) detecting a blank in a storage location which immediately follows said sequence;
   (d) if said blank is not detected, varying a variable by one;
   (e) reading a sequence of characters out of storage locations of said memory which are specified by said variable and display elements;
   (f) introducing a second, shorter pause;
   (g) repeating the steps (c) to (f) until said blank is detected in the step (c);
   (h) varying said variable by one to repeat the steps (a) to (g).

2. A paging receiver adapted to receive a radio frequency paging signal containing a preamble, a subscriber address code and a message code represented by a plurality of blocks of characters and blanks between successive characters, comprising:
   a linear array of display elements;
   a memory having a plurality of storage locations for storing said message code therein; and
   data processing means responsive to said preamble for detecting a match between the received address code and a predetermined code, storing said message code into said memory in response to the detection of said match, reading a first sequence of characters including the beginning of a word from said memory and displaying same on said display elements, sequentially detecting a blank between successive characters stored in said memory, reading a second sequence of characters including the beginning of a word from the storage positions of said memory immediately following the detected blank, and updating said display elements with the characters of the second sequence read out of the memory such that the beginning of said updated display is the start of a word;
   wherein said data processing means comprises a microcomputer programmed to execute the following steps:
   (a) resetting a first variable to zero;
   (b) addressing each of said storage locations from a position specified by a total of said first variable and a second variable to detect a blank;
   (c) varying said first variable by one;
   (d) checking if the number of said addressed locations exceeds a predetermined number;
   (e) if said predetermined number is not exceeded, varying said second variable by an amount equal to said first variable to repeat the steps (a) to (d) until said predetermined number is exceeded;
   (f) reading the characters out of the storage locations as a function of said second variable and displaying same on said display elements;
   (g) introducing a pause;
   (h) repeating the steps (a) to (g); and
   wherein said paging receiver further comprises a separate display elements located adjacent one end of said linear array, wherein said microcomputer is further programmed to execute the step (i) of displaying a mark in said separate display element in response to the step (e) to indicate that there is still a message code to be displayed.

* * * * *

UNITED STATES PATENT AND TRADEMARK OFFICE
CERTIFICATE OF CORRECTION

PATENT NO. : 4,660,032
DATED : April 21, 1987
INVENTOR(S) : Kazuyuki TSUNODA

It is certified that error appears in the above-identified patent and that said Letters Patent is hereby corrected as shown below:

Column 5, line 18, delete "57", and insert therefor --47--.

Column 6, line 67, delete "pluse", and insert therefor --plus--.

Column 7, line 33, delete "asterik", and insert therefor --asterisk--.

Signed and Sealed this

First Day of December, 1987

Attest:

DONALD J. QUIGG

Attesting Officer

Commissioner of Patents and Trademarks